US010350707B2

United States Patent
Pan et al.

(10) Patent No.: US 10,350,707 B2
(45) Date of Patent: Jul. 16, 2019

(54) NOZZLE AND ADDITIVE MANUFACTURING APPARATUS

(71) Applicant: Kabushiki Kaisha Toshiba, Minato-ku (JP)

(72) Inventors: Shanying Pan, Yokohama (JP); Hiroshi Ohno, Yokohama (JP); Hideshi Nakano, Yokosuka (JP); Kotaro Kobayashi, Mie (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 375 days.

(21) Appl. No.: 15/504,231

(22) PCT Filed: Mar. 16, 2015

(86) PCT No.: PCT/JP2015/057767
§ 371 (c)(1),
(2) Date: Feb. 15, 2017

(87) PCT Pub. No.: WO2016/042808
PCT Pub. Date: Mar. 24, 2016

(65) Prior Publication Data
US 2017/0274475 A1    Sep. 28, 2017

(30) Foreign Application Priority Data
Sep. 17, 2014    (JP) .................. 2014-189305

(51) Int. Cl.
*B23K 26/14*    (2014.01)
*B23K 26/144*    (2014.01)
(Continued)

(52) U.S. Cl.
CPC ........ *B23K 26/1476* (2013.01); *B23K 26/144* (2015.10); *B23K 26/147* (2013.01);
(Continued)

(58) Field of Classification Search
CPC ..................... B23K 26/1476; B23K 26/144; B23K 26/342; B23K 26/1464; B23K 26/147;
(Continued)

(56) References Cited

U.S. PATENT DOCUMENTS 4,380,309 A * 4/1983 Takahashi ............. G01F 11/282
222/450
5,261,285 A * 11/1993 Tokoyama ............. G01N 33/15
73/865.8
(Continued)

FOREIGN PATENT DOCUMENTS

DE      101 60 785 C1     8/2003
JP        53-24679 A       3/1978
(Continued)

OTHER PUBLICATIONS

International Search Report dated Jun. 2, 2015, in PCT/JP2015/057767, filed Mar. 16, 2015.

*Primary Examiner* — David J Walczak
(74) *Attorney, Agent, or Firm* — Oblon, McClelland, Maier & Neustadt, L.L.P.

(57) ABSTRACT

A nozzle includes a magnetic field generating section and a body. The body includes an opening from which a powder is ejected. The magnetic field generating section includes a coil, the coil disposed to generate a magnetic field when applied with a current, the magnetic field causing the powder supplied to an inside of the body to swirl around.

10 Claims, 6 Drawing Sheets

(51) Int. Cl.
  *B23K 26/342* (2014.01)
  *B33Y 30/00* (2015.01)

(52) U.S. Cl.
  CPC ........ *B23K 26/1464* (2013.01); *B23K 26/342* (2015.10); *B33Y 30/00* (2014.12)

(58) Field of Classification Search
  CPC .... B23K 26/1462; B23K 26/16; B23K 26/14; B23K 26/142; B23K 26/1423; B33Y 30/00; B33Y 40/00; B33Y 99/00
  See application file for complete search history.

(56) References Cited

U.S. PATENT DOCUMENTS

| | | | |
|---|---|---|---|
| 5,837,960 A | 11/1998 | Lewis et al. | |
| 2006/0016728 A1* | 1/2006 | Shorts | B01D 45/12 209/1 |
| 2006/0169679 A1 | 8/2006 | Sato et al. | |

FOREIGN PATENT DOCUMENTS

| | | | |
|---|---|---|---|
| JP | 57-48333 A | 3/1982 |
| JP | 2-307548 A | 12/1990 |
| JP | 11-775 A | 1/1999 |
| JP | 11-333584 A | 12/1999 |
| JP | 2005-21908 A | 1/2005 |
| JP | 2013-129525 A | 7/2013 |

\* cited by examiner

NOZZLE AND ADDITIVE MANUFACTURING APPARATUS

CROSS-REFERENCE TO RELATED APPLICATIONS

This application is national stage application of International Application No. PCT/JP2015/057767, filed Mar. 16, 2015, which designates the United States, incorporated herein by reference, and which is based upon and claims the benefit of priority from Japanese Patent Application No. 2014-189305, filed Sep. 17, 2014, the entire contents of each of which are incorporated herein by reference.

FIELD

Embodiments described herein relate generally to a nozzle and an additive manufacturing apparatus.

BACKGROUND

In the related art, an additive manufacturing apparatus, which forms an additive manufactured object in an addition manner, is known. The additive manufacturing apparatus forms a layer of a material by supplying a powder of a material from a nozzle and simultaneously irradiating the powder with laser light to melt the powder, and the layer is stacked to form an additive manufactured object.

DETAILED DESCRIPTION

According to one embodiment, a nozzle includes a magnetic field generating section and a body. The magnetic field generating section is configured to generate a magnetic field. The body is configured so that the magnetic field is generated on an inner side by the magnetic field generating section, and includes an opening configured so that a powder swirling around in the magnetic field is ejected therefrom.

Hereinafter, description will be given of a first embodiment with reference to FIG. 1 to FIG. 4. Furthermore, in this specification, basically, a vertically upward direction is defined as an upward direction, and a vertically downward direction is defined as a downward direction. In addition, a plurality of expressions may be written with respect to constituent elements according to embodiments or description of the elements. In addition, it is not inhibited to use other expressions which are not described with respect to the constituent elements and description thereof. In addition, it is not inhibited to use other expressions with respect to constituent element and description in which a plurality of expressions are not described.

Figure 1:
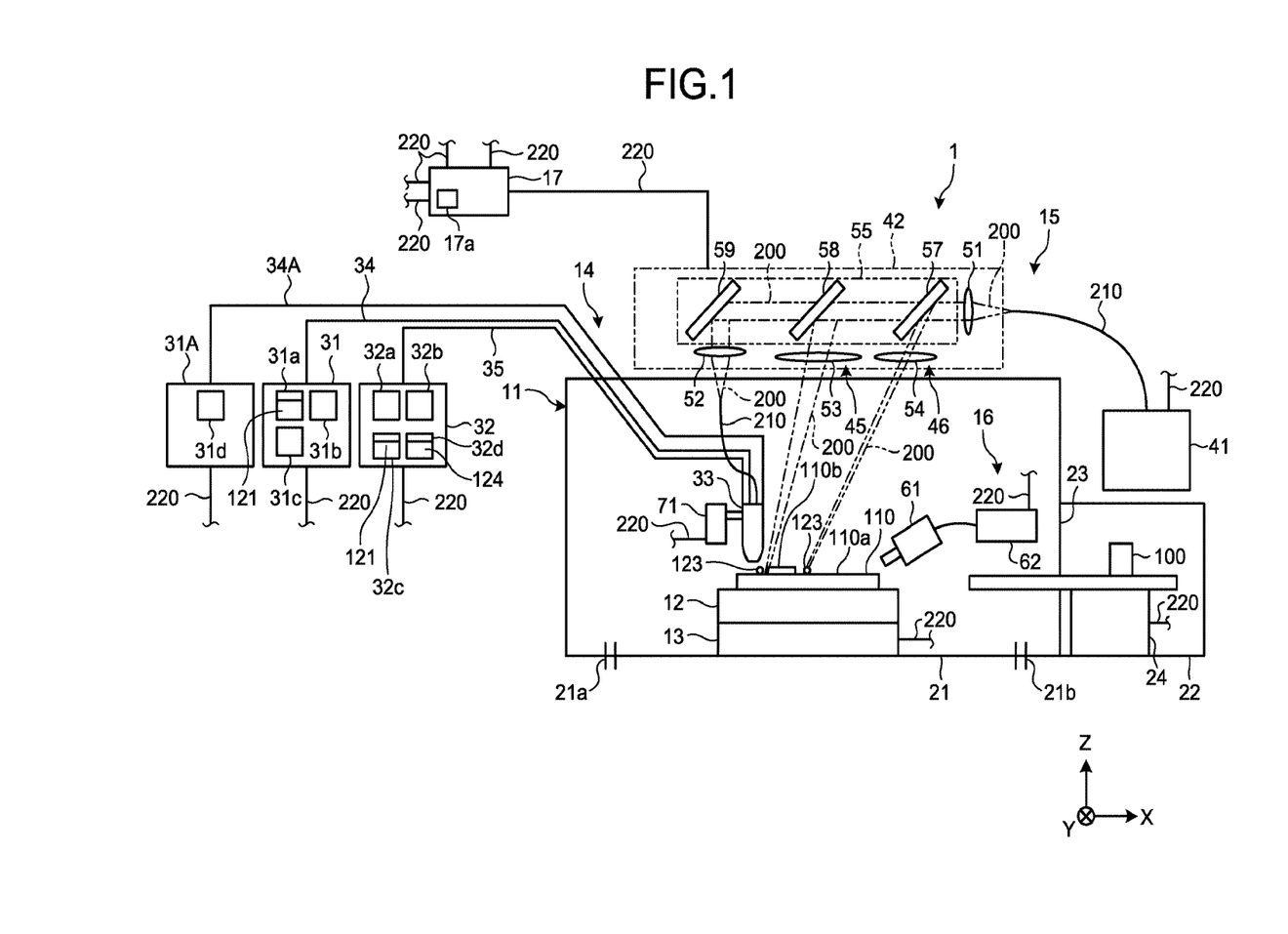
FIG. 1 is a view schematically illustrating an additive manufacturing apparatus according to a first embodiment.

FIG. 1 is a view schematically illustrating an additive manufacturing apparatus 1 according to a first embodiment. As illustrated in FIG. 1, the additive manufacturing apparatus 1 includes a processing tank 11, a stage 12, a moving device 13, a nozzle device 14, an optical device 15, a measurement device 16, and a control device 17.

In this specification, an X-axis, a Y-axis, and a Z-axis are defined as illustrated in the drawing. The X-axis, the Y-axis, and the Z-axis are perpendicular to each other. For example, the Z-axis lies along the vertical direction. Furthermore, the additive manufacturing apparatus 1 may be disposed in such a manner that the Z-axis is inclined from the vertical direction.

For example, the additive manufacturing apparatus 1 stacks a material 121, which is supplied from the nozzle device 14, on a target 110 that is disposed on the stage 12 in a layer shape to manufacture an additive manufactured object 100 having a predetermined shape. The material 121 is an example of a powder.

The target 110 is a target to which the material 121 is supplied by the nozzle device 14, and includes a base 110a and a layer 110b. A plurality of the layers 110b are laminated on an upper face of the base 110a. For example, the material 121 is a powder-shaped metallic material. Furthermore, the material 121 is not limited to thereto, and may be other materials such as a synthetic resin and ceramics. The additive manufacturing apparatus 1 manufactures the additive manufactured object 100 by using one or more kinds of materials 121.

A main chamber 21 and a sub-chamber 22 are provided in the processing tank 11. The sub-chamber 22 is provided to be adjacent to the main chamber 21. A door 23 is provided between the main chamber 21 and the sub-chamber 22. When the door 23 is opened, the main chamber 21 and the sub-chamber 22 communicate with each other. When the door 23 is closed, the main chamber 21 enters an air-tight state.

An inlet port 21a and an exhaust port 21b are provided in the main chamber 21. When an air supply device (not illustrated) operates, an inert gas such as nitrogen and argon is supplied into the main chamber 21 through the inlet port 21a. When an exhaust device (not illustrated) operates, a gas inside the main chamber 21 is discharged from the main chamber 21 through the exhaust port 21b. Furthermore, the additive manufacturing apparatus 1 may discharge the gas inside the main chamber 21 through the exhaust port 21b in order for the main chamber 21 to enter a vacuum state.

A transfer device (not illustrated) is provided in the main chamber 21. In addition, a conveying device 24 is provided in a portion ranging from the main chamber 21 to the sub-chamber 22. The transfer device transfers the additive manufactured object 100, which is processed in the main chamber 21, to the conveying device 24. The conveying device 24 conveys the additive manufactured object 100, which is transferred from the transfer device, into the sub-chamber 22. That is, the additive manufactured object 100, which is processed in the main chamber 21, is accommodated in the sub-chamber 22. After the additive manufactured object 100 accommodated in the sub-chamber 22, the door 23 is closed, and thus the sub-chamber 22 and the main chamber 21 are isolated from each other.

The stage 12, the moving device 13, a part of the nozzle device 14, and the measurement device 16 are provided in the main chamber 21.

The stage 12 supports the target 110. For example, the moving device 13 (moving mechanism) moves the stage 12 in three axial directions perpendicular to each other.

The nozzle device 14 supplies the material 121 to the target 110 that is located on the stage 12. In addition, the nozzle 33 of the nozzle device 14 irradiates the target 110 located on the stage 12 with laser light 200. The nozzle device 14 can supply a plurality of the materials 121 in parallel with each other, and can selectively supply one of the plurality of materials 121. In addition, the nozzle 33 emits the laser light 200 in parallel with the supply of the material 121. The laser light 200 is an example of an energy ray. Furthermore, the nozzle 33 may emit a different energy ray without limitation to the laser light. The energy ray may melt or sinter the material similar to the laser light, and may be, for example, an electron beam, and an electromagnetic wave in a range from a micro wave to an ultraviolet ray.

The nozzle device 14 includes a supply device 31, a supply device 31A, a discharge device 32, a nozzle 33, a supply tube 34, a supply tube 34A, and a discharge tube 35. The supply device 31 transports the material 121 to the nozzle 33 through the supply tube 34. The supply device 31A transports a gas to the nozzle 33 through the supply tube 34A. Furthermore, the material 121 is transported from the nozzle 33 to the discharge device 32 through the discharge tube 35.

The supply device 31 includes a tank 31a, a supply unit 31b, and a charging unit 31c. The tank 31a accommodates the material 121. The supply unit 31b supplies the material 121 in the tank 31a to the nozzle 33. The charging unit 31c allows the material 121, which is supplied to the nozzle 33 by the supply unit 31b, to charges negative, for example, through corona discharging. Furthermore, the charging unit 31c may charge the material 121 by another means, or may allow the material 121 to charge positive. In addition, the charging unit 31c may charge the material 121 that is accommodated in the tank 31a.

The supply device 31A includes a gas supply unit 31d. The supply device 31A supplies a shield gas (gas) to the nozzle 33. For example, the shield gas is an inert gas such as nitrogen and argon. Furthermore, in a case where the main chamber 21 is evacuated, the nozzle device 14 may not include the supply device 31A.

The discharge device 32 includes a classifying device 32a, a discharge unit 32b, and tanks 32c and 32d. The discharge unit 32b suctions a gas from the nozzle 33. The classifying device 32a separates the material 121 and fume in the gas that is suctioned by the discharge unit 32b. The tank 32c accommodates the material 121, and the tank 32d accommodates a fume 124. According to this, a powder of the material 121 that is not used for manufacturing, fume (metallic fume), dust, and the like that are generated through the manufacturing are discharged from a processing region in combination with the gas. For example, the discharge unit 32b is a pump.

In addition, as illustrated in FIG. 1, the optical device 15 includes a light source 41 and an optical system 42. The light source 41 includes an oscillation element (not illustrated), and emits laser light 200 through oscillation of the oscillation element. The light source 41 can change a power density of the laser light 200 that is emitted.

A light source 41 is connected to an optical system 42 through a cable 210. The laser light 200, which is emitted from the light source 41, is incident to the nozzle 33 through the optical system 42. The nozzle 33 irradiates the target 110 or the material 121 sprayed toward the target 110 with the laser light 200.

For example, the optical system 42 includes a first lens 51, a second lens 52, a third lens 53, a fourth lens 54, and a galvano scanner 55. The first lens 51, the second lens 52, the third lens 53, and the fourth lens 54 are fixed. Furthermore, the optical system 42 may include an adjustment device that can move the first lens 51, the second lens 52, the third lens 53, and the fourth lens 54, for example, in two axial directions that intersects (is perpendicular to) an optical path.

The first lens 51 converts the laser light 200, which is incident through the cable 210, into parallel light. The laser light 200, which is converted, is incident to the galvano scanner 55.

The second lens 52 converges the laser light 200 that is emitted from the galvano scanner 55. The laser light 200, which is converged in the second lens 52, reaches the nozzle 33 through the cable 210.

The third lens 53 converges the laser light 200 that is emitted from the galvano scanner 55. The laser light 200, which is converged in the third lens 53, is emitted onto the target 110.

The fourth lens 54 converges the laser light 200 that is emitted from the galvano scanner 55. The laser light 200, which is converged in the fourth lens 54, is emitted to the target 110.

The galvano scanner 55 divides the parallel light, which is converted in the first lens 51, into light beams which are respectively incident to the second lens 52, the third lens 53, and the fourth lens 54. The galvano scanner 55 includes a first galvano mirror 57, a second galvano mirror 58, and a third galvano mirror 59. Each of the galvano mirrors 57, 58, and 59 divides light, and an inclination angle (emission angle) thereof can be changed.

The first galvano mirror 57 allows a part of the laser light 200, which passes through the first lens 51, to pass through the first galvano mirror 57, and emits the laser light 200, which passes through the first galvano mirror 57, to the second galvano mirror 58. In addition, the first galvano mirror 57 reflects the other part of the laser light 200, and emits the laser light 200, which is reflected, to the fourth lens 54. The first galvano mirror 57 changes an irradiation position of the laser light 200, which passes through the fourth lens 54, in accordance with an inclination angle of the first galvano mirror 57.

The second galvano mirror 58 allows a part of the laser light 200, which passes through the first galvano mirror 57, to pass through the second galvano mirror 58, and emits the laser light 200, which passes through the second galvano mirror 58, to the third galvano mirror 59. In addition, the second galvano mirror 58 reflects the other part of the laser light 200, and emits the laser light 200, which is reflected, to the third lens 53. The second galvano mirror 58 changes an irradiation position of the laser light 200, which passes through the third lens 53, in accordance with an inclination angle of the second galvano mirror 58.

The third galvano mirror 59 emits a part of the laser light 200, which passes through the second galvano mirror 58, to the second lens 52.

The optical system 42 includes a melting device 45 that includes the first galvano mirror 57, the second galvano mirror 58, and the third lens 53. The melting device 45 forms a layer 110h and simultaneously performs an annealing process by heating the material 121 (123) that is supplied from the nozzle 33 to the target 110 through irradiation of the laser light 200.

In addition, the optical system 42 includes a removal device 46 that includes the first galvano mirror 57 and the fourth lens 54 and removes the material 121. The removal device 46 removes an unnecessary portion formed on the base 110a or in the layer 110b through irradiation of the laser light 200. For example, the removal device 46 removes a portion that is different from a predetermined shape of the additive manufactured object 100 such as an unnecessary portion that occurs scattering of the material 121 during supply of the material 121 by the nozzle 33, and an unnecessary portion that occurs during formation of the layer 110b. The removal device 46 emits the laser light 200 with a power density capable of removing the unnecessary portion.

The measurement device 16 measures a shape of the layer 110b that is solidified, and a shape of the additive manufactured object 100 that is manufactured. The measurement device 16 transmits information relating to the measured shape to the control device 17. For example, the measurement device 16 includes a camera 61 and an image processing device 62. The image processing device 62 perform image processing on the basis of information measured by the camera 61. Furthermore, the measurement device 16 measures the layer 110b and the additive manufactured object 100, for example, in accordance with an interferometry, a light-section method, and the like.

A moving device 71 (moving mechanism) moves the nozzle 33 in three axial directions perpendicular to each other.

The control device 17 is electrically connected to the moving device 13, the conveying device 24, the supply device 31, the supply device 31A, the discharge device 32, the light source 41, the galvano scanner 55, the image processing device 62, and the moving device 71 through a signal line 220.

The control device 17 controls the moving device 13 to move the stage 12 in three axial directions. The control device 17 controls the conveying device 24 to convey the additive manufactured object 100 that is manufactured to the sub-chamber 22. The control device 17 controls the supply device 31 to adjust supply or non-supply, and a supply amount of the material 121. The control device 17 controls the discharge device 32 to adjust discharge or non-discharge, and a discharge amount of a powder of the material 121 or the fume. The control device 17 controls the light source 41 to adjust the power density of the laser light 200 that is emitted from the light source 41. The control device 17 controls the galvano scanner 55 to adjust the inclination angle of the first galvano mirror 57, the second galvano mirror 58, and the third galvano mirror 59. In addition, the control device 17 controls a moving device 71 to control a position of the nozzle 33.

The control device 17 includes a storage unit 17a. For example, the storage unit 17a stores data representing a shape (reference shape) of the additive manufactured object 100 to be manufactured. In addition, the storage unit 17a stores data representing the height of the nozzle 33 and the stage 12 for each three-dimensional processing position (each point).

The control device 17 has a function of selectively supplying a plurality of the materials 121 different from each other from the nozzle 33, and adjusting (changing) a ratio of the plurality of materials 121. For example, the control device 17 controls the supply device 31 in order for the layer 110b of the materials 121 to be formed at a ratio based on data that is stored in the storage unit 17a and represents the ratio of each of the materials 121. According to this function, a gradient material (gradient function material), in which the ratio of the plurality of materials 121 varies (gradually increases or gradually decreases) in accordance with a position (location) of the additive manufactured object 100, can be manufactured. For example, in formation of the layer 110b, the control device 17 controls the supply device 31 to realize a ratio of the materials 121 which is set (stored) in correspondence with each position of three-dimensional coordinates of the additive manufactured object 100. According to this, it is possible to manufacture the additive manufactured object 100 as a gradient material (gradient function material) in which the ratio of the materials 121 varies in an arbitrary three-dimensional direction. A variation amount (variation rate) of the ratio of the materials 121 per unit length can be set in various manners.

The control device 17 has a function of determining the shape of the layer 110b or the manufactured object 100. For example, the control device 17 compares the shape of the layer 110b or the additive manufactured object 100 which is acquired by the measurement device 16, and the reference shape stored in the storage unit 17a to determine whether or not a portion in a shape other than a predetermined shape is formed.

In addition, the control device 17 has a function of trimming the layer 110b or the manufactured object 100 to a predetermined shape by removing an unnecessary portion that is determined as a portion that does not have a predetermined shape through the determination on the shape of the layer 110b or the manufactured object 100. For example, first, the control device 17 controls the light source 41 so that the laser light 200 emitted from the fourth lens 54 through the first galvano mirror 57 to a portion that does not have the predetermined shape in the layer 110b or the additive manufactured object 100 has a power density capable of evaporating the materials 121. Subsequently, the control device 17 controls the first galvano mirror 57 to irradiate a corresponding portion with the laser light 200, thereby evaporating the corresponding portion.

Figure 2:
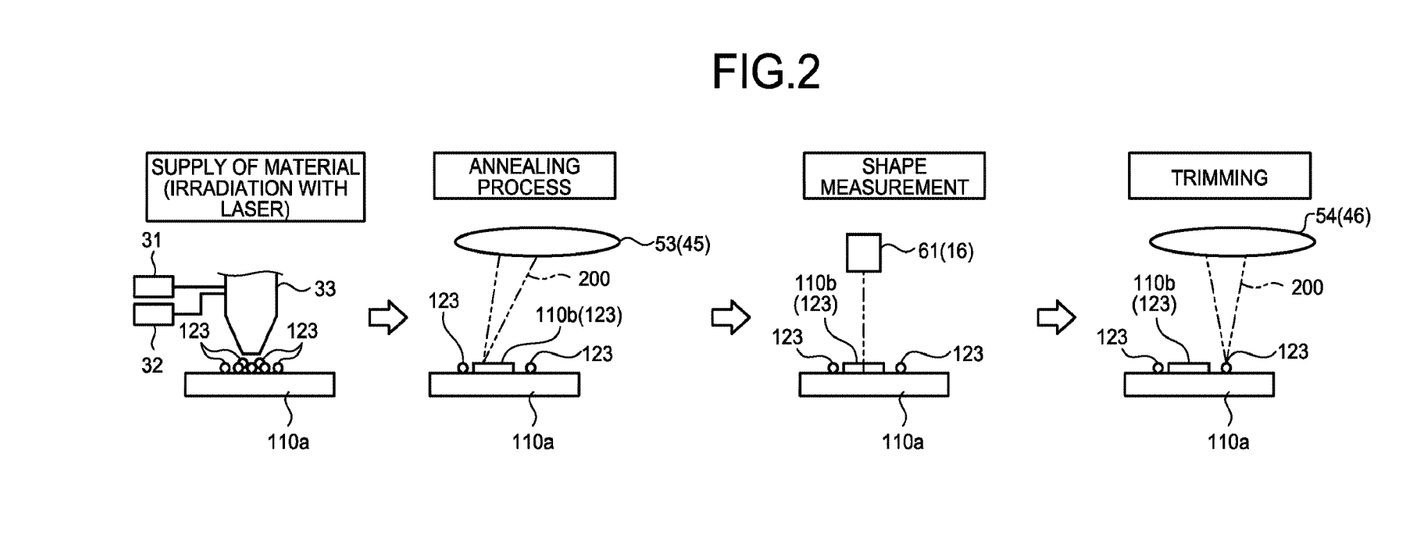
FIG. 2 is a view schematically illustrating an example of a procedure of a manufacturing process by the additive manufacturing apparatus according to the first embodiment.

Next, description will be given of an example of a method of manufacturing the additive manufactured object 100 by the additive manufacturing apparatus 1 with reference to FIG. 2. FIG. 2 is a view schematically illustrating an example of a procedure of a manufacturing process (manufacturing method) by the additive manufacturing apparatus 1.

As illustrated in FIG. 2, first, the additive manufacturing apparatus 1 performs supply of each of the materials 121 and irradiation with the laser light 200. The control device 17 controls the supply device 31 and the nozzle 33 so that the material 121 is supplied to a predetermined range from the nozzle 33, and controls the light source 41 and the galvano scanner 55 so that the supplied material 121 is melted or sintered with the laser light 200. According to this, as illustrated in FIG. 2, a melted or sintered material 123 is supplied in a predetermined amount to a range of forming the layer 110b on the base 110a. When being sprayed to the base 110a or the layer 110b, the material 123 is deformed and becomes an aggregate of the material 123 such as a layer shape and a thin film shape. Alternatively, the material 123 is cooled down through heat transfer to an aggregate of the material 121, and is laminated in a granular shape and becomes a granular aggregate.

Next, the additive manufacturing apparatus 1 performs an annealing process. The control device 17 controls the light source 41 and the melting device 45 so that the aggregate of the material 123 on the base 110a is irradiated with the laser light 200. According to this, an aggregate of the material 123 is melted again or is sintered again to form a layer 110b.

Next, the additive manufacturing apparatus 1 performs shape measurement. The control device 17 controls the measurement device 16 to measure the material 123 on the base 110a that is subjected to the annealing process. The control device 17 compares a shape of the layer 110b or the additive manufactured object 100 which is acquired by the measurement device 16, and the reference shape stored in the storage unit 17a.

Next, the additive manufacturing apparatus 1 performs trimming. For example, in a case where it is determined that the material 123 on the base 110a is attached to a position different from a predetermined shape through the shape measurement and the comparison with the reference shape, the control device 17 controls the light source 41 and the removal device 46 in order for an unnecessary portion of the material 123 to evaporate. On the other hand, in a case where it is determined that the layer 110b has a predetermined shape through the shape measurement and the comparison with the reference shape, the control device 17 does not perform the trimming.

When the formation of the layer 110b is terminated, the additive manufacturing apparatus 1 forms a new layer 110b on the corresponding layer 110b. The additive manufacturing apparatus 1 repetitively stacks the layer 110b to manufacture the additive manufactured object 100.

Figure 3:
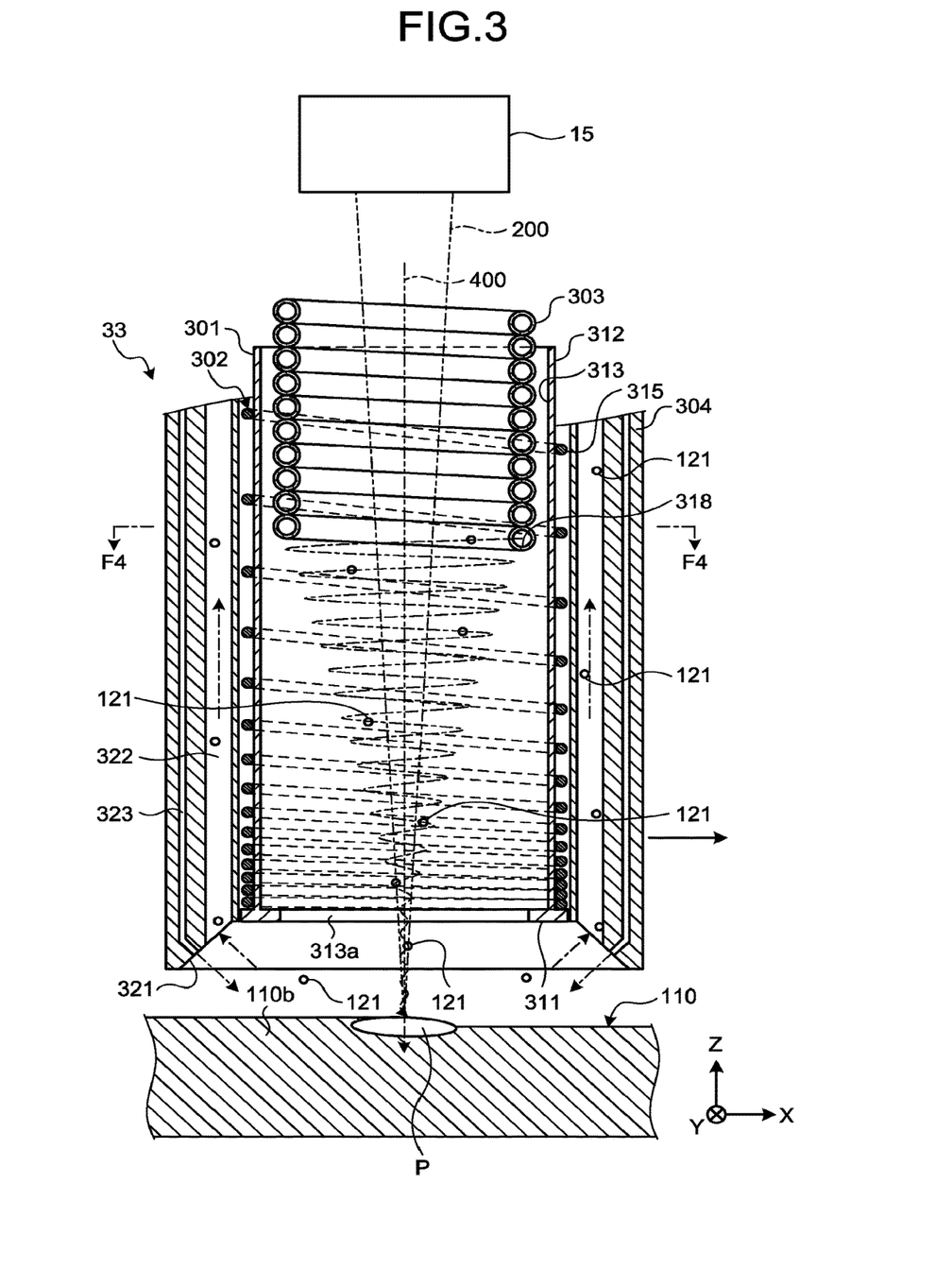
FIG. 3 is a cross-sectional view illustrating a nozzle, an optical device, and a target of the first embodiment.

Next, the nozzle 33 will be described in detail with reference to FIG. 3 and FIG. 4. FIG. 3 is a cross-sectional view illustrating the nozzle 33, the optical device 15, and the target 110. As illustrated in FIG. 3, the nozzle 33 includes a first body 301, a magnetic field generating section 302, a supply unit 303, and a second body 304.

For example, at least a surface of the first body 301 is formed from a material having electrically insulating properties, and the first body 301 is formed in a cylindrical shape that extends in a direction along the Z-axis. Furthermore, the material and the shape of the first body 301 are not limited thereto. The first body 301 includes an end face 311, an outer peripheral face 312, and a first opening 313. The first opening 313 is an example of an opening.

The end face 311 is provided on one end of the first body 301, and is a substantially flat surface that faces a downward side. The end face 311 faces the target 110 through a gap having a predetermined length. The outer peripheral face 312 is a curved surface in a cylindrical shape that extends in a direction along the Z-axis.

The first opening 313 is a circular hole that is opened to the end face 311 and extends in a direction along the Z-axis. That is, an end 313a of the first opening 313 is provided on the end face 311. An inner diameter of the first opening 313 is substantially constant, and may be reduced in a taper shape, for example, toward the end face 311. The central axis of the first opening 313 is substantially the same as the central axis of the outer peripheral face 312.

An inner diameter of the end 313a of the first opening 313 is smaller than an inner diameter of other portions of the first opening 313. Furthermore, the inner diameter of the end 313a of the first opening 313 may be substantially the same as the inner diameter of the other portions of the first opening 313.

The magnetic field generating section 302 includes a coil 315. The coil 315 is a solenoid coil that is wound around the outer peripheral face 312 of the first body 301 and extends in a direction along the Z-axis. Furthermore, for example, the coil 315 may be disposed on an inner side of the first opening 313. The central axis of the coil 315 is substantially the same as the central axis of the first opening 313.

A number of windings (winding density) per length of the coil 315 increases toward the end 313a of the first opening 313. In other words, a distance (pitch) between adjacent conducting wires of the coil 315 decreases as it goes toward the end 313a of the first opening 313. For example, the number of windings per length of the coil 315 continuously increases toward the end 313a of the first opening 313. Furthermore, for example, the number of windings per length of the coil 315 may increase step by step toward the end 313a of the first opening 313.

For example, the control device 17 controls a driving circuit so as to allow a predetermined current to flow through the coil 315 (to apply a voltage thereto). When a current flows through the coil 315, the coil 315 generates a magnetic field on an inner side of the first opening 313. The following respective drawings illustrate only a magnetic field central axis 400 that is a central axis of the magnetic field that is generated by the coil 315. The magnetic field is spatially distributed on an inner side of the first opening 313 of the coil 315. That is, the coil 315 generates not only a magnetic field component that extends along the magnetic field central axis 400, but also a plurality of other magnetic field components which are diffused from the end 313a of the first opening 313.

The magnetic field central axis 400 of the magnetic field generated by the coil 315 extends linearly from an inner side to an outer side of the first opening 313 along the central axis of the first opening 313. The magnetic field central axis 400 extends in a direction that faces the target 110 from the end 313a of the first opening 313.

The intensity of the magnetic field, in which the magnetic field central axis 400 is set as the central axis, varies in accordance with the number of windings per length of the coil 315. Accordingly, the intensity of the magnetic field, in which the magnetic field central axis 400 is set as the central axis, increases toward the end 313a of the first opening 313. In other words, a magnetic flux density in the first opening 313 increases as it goes toward the end 313a of the first opening 313.

At least a part of the supply unit 303 is disposed on an inner side of the first opening 313. The supply unit 303 is spaced away from the end 313a of the first opening 313 by a predetermined length. For example, the supply unit 303 is a tube that is wound in a helical shape. Furthermore, the supply unit 303 is not limited thereto.

The central axis of the supply unit 303 is substantially the same as the central axis of the first opening 313. An outer diameter of the supply unit 303 is smaller than the inner diameter of the first opening 313. The outer diameter of the supply unit 303 is substantially constant. However, for example, the outer diameter may vary as it goes toward the end 313a of the first opening 313.

The supply unit 303 includes a supply port 318. The supply port 318 is provided in one end of the supply unit 303 and is located on an inner side of the first opening 313. The supply port 318 is spaced away from the central axis of the first opening 313 on an plane that is formed by the X-axis and the Y-axis. The supply port 318 is opened toward a circumferential direction of the supply unit 303 that is wound in a helical shape. In other words, the supply port 318 is opened toward a direction that intersects the magnetic field central axis 400.

The supply unit 303 is connected to the supply device 31 through the supply tube 34 in FIG. 1 and is supplied with the material 121 from the supply device 31. The supply unit 303 supplies the material 121 from the supply port 318 to an inner side the first opening 313.

Figure 4:
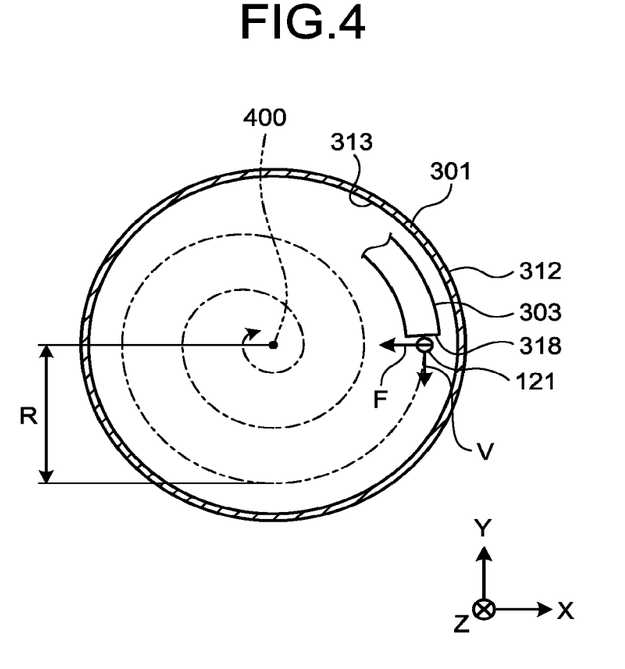
FIG. 4 is a cross-sectional view schematically illustrating a first body and a supply unit of the first embodiment along F4-F4 line in FIG. 3.

FIG. 4 is a cross-sectional view schematically illustrating the first body 301 and the supply unit 303 along line F4-F4 in FIG. 3. The material 121 passes through the supply unit 303 that is wound in a helical shape, and is discharged to an inner side of the first opening 313. Accordingly, as illustrated in FIG. 4, the material 121 has a velocity V in a circumferential direction with respect to the magnetic field central axis 400. In other words, the supply unit 303 applies the velocity V in the circumferential direction with respect to the magnetic field central axis 400 to the material 121 and supplies the material 121 to an inner side of the first opening 313.

The material 121, which is supplied to the first opening 313, may have a velocity component that faces another direction. For example, even when the supply unit 303 applies a velocity in a direction that deviates from the circumferential direction with respect to the magnetic field central axis 400 to the material 121, and supplies the material 121, the material 121 may have a velocity component (velocity V) that faces the circumferential direction with respect to the magnetic field central axis 400. In addition, a downward velocity is further applied to the material 121 due to gravity.

The material 121 is charged with the charging unit 31c in FIG. 1. Accordingly, when the material 121 having the velocity V is supplied to an inner side of the first opening 313, a Lorentz force F acts on the material 121 due to a magnetic field in which the magnetic field central axis 400 is set as the central axis. The Lorentz force F acts on the material 121 as a centripetal force that faces the magnetic field central axis 400. Accordingly, the material 121 has a cyclotron motion of swirling around the magnetic field central axis 400 in the magnetic field in which the magnetic field central axis 400 is set as the central axis while moving to a downward side due to gravity.

A motion radius R, which is a distance from the magnetic field central axis 400, of the material 121 that swirls around due to the magnetic field in which the magnetic field central axis 400 is set as the central axis is expressed by the following Expression (1).

$$R = m \cdot V / (e \cdot B) \quad (1)$$

In Expression (1), m represents a mass of the material 121, e represents a charge of the material 121, and B represents a magnetic flux density that acts on the material 121. During the swirling around, a distance between the material 121 and the magnetic field central axis 400 is shown as the motion radius R.

As illustrated in Expression (1), as the magnetic flux density B increases, the motion radius R of the swirling material 121 decreases. Accordingly, as it goes toward the end 313a of the first opening 313, the motion radius R of the material 121 becomes shorter. That is, as illustrated in FIG. 3, as it goes toward the end 313a of the first opening 313, a swirling orbit of the material 121 becomes a spiral shape of which an end becomes thinner. As described above, the material 121, which is discharged to a position spaced away from the magnetic field central axis 400, swirls around and is converged toward a direction of the magnetic field central axis 400.

A distance between the supply port 318 of the supply unit 303 and the magnetic field central axis 400 is, for example, 2 mm. In addition, the motion radius R of the material 121 at the end 313a of the first opening 313 is, for example, 0.2 mm. As described above, the material 121 is converged toward the direction of the magnetic field central axis 400.

The magnetic field central axis 400 continues from an inner side to an outer side of the first opening 313. Accordingly, the material 121 swirls around in the magnetic field in which the magnetic field central axis 400 is set as the central axis, and is ejected from the end 313a of the first opening 313. The ejected material 121 drops while swirling around, and is supplied to the target 110.

In the direction along the Z-axis, a force that acts on the material 121 is mainly gravity. The Lorentz force F does not allow a force facing the direction along the Z-axis (magnetic field direction) to act on the material 121. Accordingly, in the direction along the Z-axis, the material 121 drops only in accordance with gravity. Furthermore, the Lorentz force F or another force may act on the material 121 in the direction along the Z-axis.

The first body 301 of the nozzle 33 emits the laser light 200, which is emitted from the optical device 15, from the first opening 313. The laser light 200 passes through an inner side of the first opening 313 in a manner of overlapping with the magnetic field central axis 400, and is emitted from the end 313a of the first opening 313 toward an outer side.

Since the laser light 200 overlaps with the magnetic field central axis 400, the material 121 swirls around the laser light 200. In other words, the magnetic field generating section 302 generates a magnetic field, which allows the material 121 to swirls around the laser light 200 and in which the magnetic field central axis 400 is set as the central axis, on an inner side of the first opening 313.

The control device 17 controls the light source 41 and the galvano scanner 55 so that the laser light 200 is converged to a surface of the target 110. In addition, the material 121 is converged toward the magnetic field central axis 400 while swirling around. The material 121 and the laser light 200 move to approximately the same point on the surface of the target 110.

The laser light 200 melts the material 121 that is ejected from the first opening 313 and is supplied to the target 110 while swirling around. According to this, the material 123, which is melted, is supplied to the target 110. When the material 123, which is melted, is supplied, or the surface of the target 110 is irradiated with the laser light 200, a molten pool P is formed in the target 110.

When the moving device 71 in FIG. 1 changes a distance between the nozzle 33 and the target 110, a range of irradiating the target 110 with the laser light 200 varies. According to this, the size of the molten pool P varies. Even when the size of the molten pool P varies, the motion radius R of the swirling material 121 when reaching the target 110 is smaller than a radius of the molten pool P. Accordingly, the swirling material 121 is supplied to the molten pool P.

The material 121 swirls around the periphery of the laser light 200. In addition, the material 121 may be irradiated with the laser light 200 before reaching the target 110. Accordingly, the material 121 is preliminarily heated by the laser light 200. The material 121, which is heated, softens at an earlier time, or is likely to be melted or sintered by the laser light 200. Accordingly, the material 121 is not likely to scatter, and can be supplied to the molten pool P in a more reliable manner.

A plurality of materials 121 may be melted and fused to each other before reaching the target 110. In this case, the mass m of the fused material 121 increases, but the charge e of the material 121 also increases. Accordingly, the motion radius R of the fused material 121 becomes approximately the same as the motion radius R of the material 121 before the fusion.

As described above, the nozzle 33 supplies the material 121 to a shaping spot of the target 110 that faces a distal end of the nozzle 33, and irradiates the shaping spot with the laser light 200. The shaping spot of the target 110 is located on an extension line of the central axis of the first opening 313 and the magnetic field central axis 400. The material 121 swirls around in the magnetic field in which the magnetic field central axis 400 is set as the central axis, and is guided to the shaping spot of the target 110.

The second body 304 is formed in a cylindrical shape that extends in a direction along the Z-axis. The second body 304 is overlaid on the first body 301 and surrounds the first body 301. Furthermore, the second body 304 and the first body 301 may be integrally formed.

One end of the second body 304 is opened to expose the end face 311 of the first body 301. The second body 304 includes an end face 321, a second opening 322, and a third opening 323.

The end face 321 of the second body 304 is formed in a circular shape that surrounds the end face 311 of the first body 301 that is exposed. The end face 321 of the second body 304 is located on a downward side of the end face 311 of the first body 301. The end face 321 of the second body 304 is formed in a taper shape in which a diameter is reduced as it goes toward the end face 311 of the first body 301.

The second opening 322 is a circular hole that is opened to the end face 321 of the second body 304, and extends in a direction along the Z-axis. The second opening 322 is connected to the discharge device 32 through the discharge tube 35. The discharge device 32 suctions a powder of the material 121 and fume from the second opening 322.

The third opening 323 is a circular hole that is opened to the end face 321 of the second body 304 and extends in a direction along the Z-axis. The third opening 323 surrounds the second opening 322. The third opening 323 is connected to the supply device 31A through the supply tube 34A. The supply device 31A supplies a shield gas from the third opening 323. Furthermore, in a case where the main chamber 21 is evacuated, the second body 304 may not include the third opening 323.

In the additive manufacturing apparatus 1 according to the first embodiment, the magnetic field generating section 302 generates the magnetic field, in which the magnetic field central axis 400 is set as the central axis, on an inner side of the first opening 313 of the first body 301. The material 121 is ejected from the end 313a of the first opening 313 while swirling around in the magnetic field in which the magnetic field central axis 400 is set as the central axis. Accordingly, the material 121 is suppressed from getting out of a circling orbit which occurs due to the magnetic field in which the magnetic field central axis 400 is set as the central axis. Accordingly, for example, diffusion of the ejected material 121, which is ejected from the first opening 313, in a direction deviating from the molten pool P is suppressed. In addition, a carrier gas, which allows the material 121 to move to the target 110, is not necessary. Accordingly, scattering of the material 121 caused by the carrier gas that spreads in the vicinity of the first opening 313 due to a difference in an atmospheric pressure between an inner side and an outer side of the first opening 313, or rebounding of the material 121, to which movement energy is applied by the carrier gas, from the target 110 is suppressed. Accordingly, the material 121 is supplied to the target 110 in a more accurate manner, and manufacturing accuracy of the additive manufactured object 100 is improved.

In addition, even when reaching the target 110, the material 121 swirls around in the magnetic field in which the magnetic field central axis 400 is set as the central axis. Accordingly, even when rebounding from the target 110, the material 121 moves to a lateral side instead of an upper side. Accordingly, returning of the rebounding material 121 to the first opening 313 is suppressed. In addition, the rebounding material 121 is effectively discharged from the second opening 322 that surrounds the first opening 313.

The supply unit 303 applies the velocity V in the circumferential direction with respect to the central axis of the magnetic field central axis 400 to the material 121 and supplies the material 121 to an inner side of the first opening 313. According to this, the material 121 can swirl around in the magnetic field in which the magnetic field central axis 400 is set as the central axis in a more reliable manner, and the material 121 is supplied to the target 110 in a more accurate manner.

The magnetic field, which is generated by the magnetic field generating section 302 and in which the magnetic field central axis 400 is set as the central axis, increases toward the end 313a of the first opening 313 from which the material 121 is ejected. The motion radius R of the swirling material 121 is inversely proportional to the magnetic flux density B, and thus the motion radius R becomes shorter as it goes toward the end 313a of the first opening 313. Accordingly, the material 121 swirls around to be further adjacent to the magnetic field central axis 400 as it goes toward the end 313a of the first opening 313. As a result, the material 121 is supplied to the target 110 in a more accurate manner.

The number of windings per length of the coil 315 of the magnetic field generating section 302 increases toward the end 313a of the first opening 313. According to this, the magnetic field, which is generated by the coil 315, and in which the magnetic field central axis 400 is set as the central axis, increases toward the end 313a of the first opening 313, and the material 121 is supplied to the target 110 in a more accurate manner.

The magnetic field generating section 302 generates the magnetic field which allows the material 121 to swirl around the periphery of the laser light 200 and in which the magnetic field central axis 400 is set as the central axis, on an inner side of the first opening 313. That is, the laser light 200 passes through an inner side of the swirling material 121. Accordingly, for example, it is not necessary to block a portion through which the laser light 200 passes and a portion through which the material 121 passes with a wall, and thus it is possible to miniaturize the nozzle 33. In addition, it is possible to miniaturize the additive manufacturing apparatus 1. In addition, the material 121 is preliminarily heated by the laser light 200, and thus the material 121 is likely to soften, or the material 121 is likely to be melted or sintered. Accordingly, the material 121 is likely to be attached to the target 110, and thus rebounding of the material 121 from the target 110 is further suppressed.

The charging unit 31c charges the material 121 that is supplied to an inner side of the first opening 313. According to this, the material 121 can swirl around in the magnetic field, in which the magnetic field central axis 400 is set as the central axis, in a more reliable manner, and it is possible to control a swirling orbit of the material 121 that swirls around in the magnetic field in which the magnetic field central axis 400 is set as the central axis.

Hereinafter, description will be given of a second embodiment with reference to FIG. 5. Furthermore, in the following description of a plurality of embodiments, the same reference numeral will be given of a constituent element having the same function as a constituent element that has been described already, and description thereof may be omitted. In addition, a plurality of constituent elements, to which the same reference numeral is given, are not limited to have functions and properties which are common, and may have other functions and properties which are different in accordance with respective embodiments.

Figure 5:
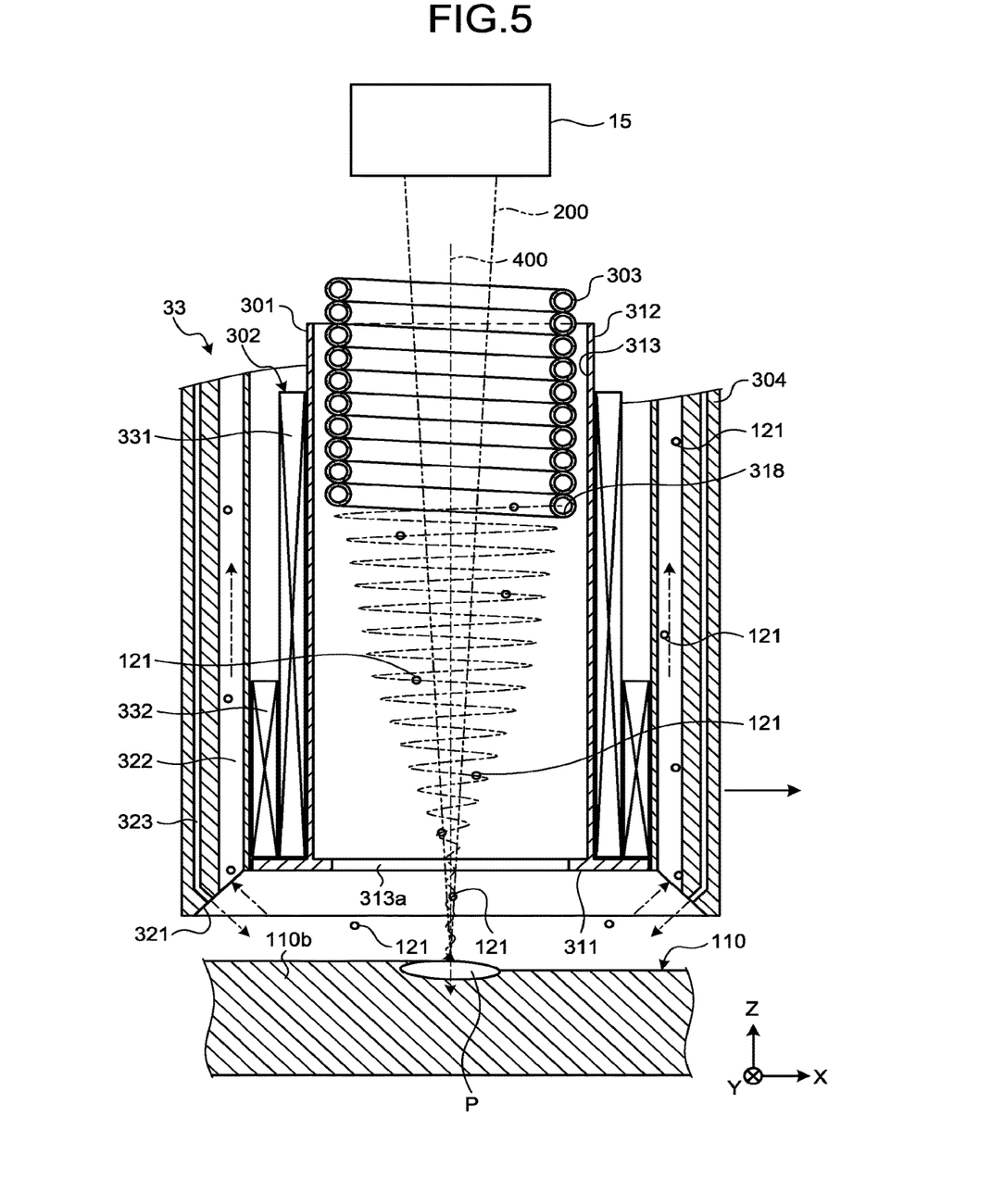
FIG. 5 is a cross-sectional view illustrating a nozzle, an optical device, and a target according to a second embodiment.

FIG. 5 is a cross-sectional view illustrating a nozzle 33, an optical device 15, and a target 110 according to a second embodiment. As illustrated in FIG. 5, a magnetic field generating section 302 of the second embodiment includes a first coil 331 and a second coil 332. The first coil 331 and the second coil 332 are an example of a plurality of coils overlaid on each other.

The first coil 331 is a solenoid coil that is wound around the outer peripheral face 312 of the first body 301 and extends in a direction along the Z-axis. Furthermore, the first coil 331 may be disposed on an inner side of the first opening 313. The central axis of the first coil 331 is substantially the same as the central axis of the first opening 313. A number of windings per length of the first coil 331 is substantially constant. The number of windings per length of the first coil 331 may increase toward the end 313a of the first opening 313.

The second coil 332 is a solenoid coil that is wound around the outer periphery of the first coil 331 and extends in a direction along the Z-axis. In other words, the second coil 332 is overlaid on the first coil 331 from an outer side. Furthermore, the second coil 332 may be overlaid on an inner side of the first coil 331.

The central axis of the second coil 332 is substantially the same as the central axis of the first opening 313. A number of windings per length of the second coil 332 is substantially constant. Furthermore, the number of windings per length of the second coil 332 may increase toward the end 313a of the first opening 313. In addition, the number of windings per length of the first coil 331 and the number of windings per length of the second coil 332 may be the same as each other or may be different from each other.

The length of the second coil 332 in the direction along the Z-axis is shorter than the length of the first coil 331. Accordingly, the second coil 332 is partially overlaid on the first coil 331. More specifically, the second coil 332 is overlaid on the first coil 331 in the vicinity of the end 313a of the first opening 313. That is, in the vicinity of the end 313a of the first opening 313, the first coil 331 and the second coil 332 are wound around the first body 301. On the other hand, in the vicinity of the supply unit 303, only the first coil 331 is wound around the first body 301. As described above, the number of overlaid coils (the first coil 331 and the second coil 332) increases toward the end 313a of the first opening 313.

The first coil 331 and the second coil 332 generates a magnetic field, in which the magnetic field central axis 400 is set as the central axis, on an inner side of the first opening 313. The intensity of the magnetic field in which the magnetic field central axis 400 is set as the central axis in the vicinity of the end 313a of the first opening 313 around which the first coil 331 and the second coil 332 are wound is stronger than the intensity of the magnetic field in which the magnetic field central axis 400 is set as the central axis in the vicinity of the supply unit 303 around which only the first coil 331 is wound. As described above, the intensity of the magnetic field, in which the magnetic field central axis 400 is set as the central axis, increases toward the end 313a of the first opening 313.

The material 121 is also converged toward the magnetic field central axis 400 while swirling around due to the magnetic field which is generated by the magnetic field generating section 302 of the second embodiment and in which the magnetic field central axis 400 is set as the central axis. Furthermore, the number of coils of the magnetic field generating section 302 may be three or greater.

In the additive manufacturing apparatus 1 of the second embodiment, the number of the overlaid coils (the first coil 331 and the second coil 332) increases toward the end 313a of the first opening 313. According to this, the magnetic field, which is generated by the first coil 331 and the second coil 332 and in which the magnetic field central axis 400 is set as the central axis, increases toward the end 313a of the first opening 313, and thus the material 121 is supplied to the target 110 in a more accurate manner.

Figure 6:
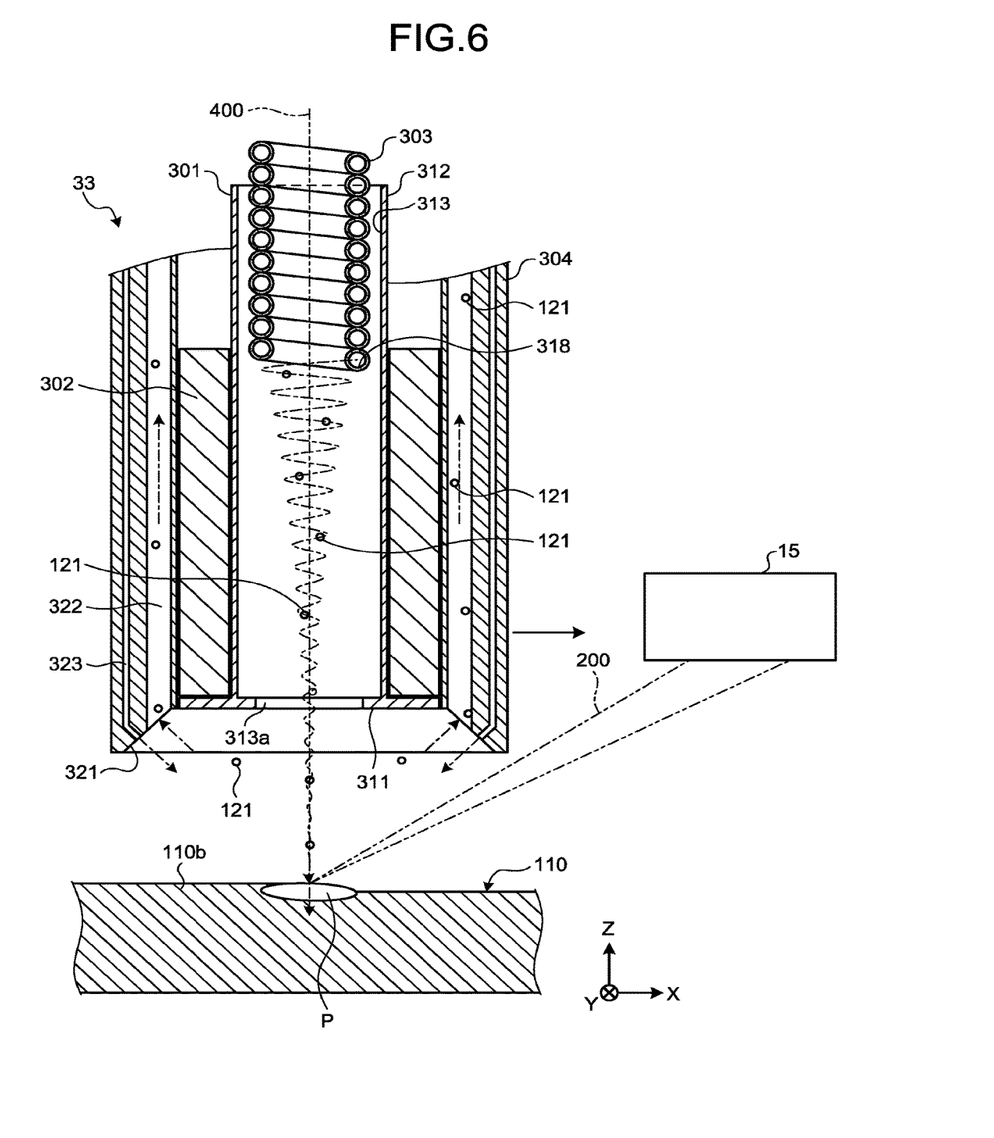
FIG. 6 is a cross-sectional view illustrating a nozzle, an optical device, and a target according to a third embodiment.

Hereinafter, description will be given of a third embodiment with reference to FIG. 6. FIG. 6 is a cross-sectional view illustrating a nozzle 33, an optical device 15, and a target 110 according to the third embodiment. As illustrated in FIG. 6, laser light 200 in the third embodiment is emitted to the target 110 from an outer side of the nozzle 33.

The magnetic field generating section 302 generates a magnetic field, in which the magnetic field central axis 400 is set as the central axis, on an inner side of the first opening 313, for example, by a solenoid coil. A number of windings per length of the solenoid coil is substantially constant. Accordingly, the intensity of the magnetic field, which is generated by the magnetic field generating section 302 and in which the magnetic field central axis 400 is set as the central axis, is substantially constant. Furthermore, the number of windings per length of the solenoid coil may increase toward the end 313a of the first opening 313.

In a case where the motion radius R of the material 121, which swirls around due to the magnetic field in which the magnetic field central axis 400 is set as the central axis, is shorter than a distance between the supply port 318 of the supply unit 303 and the magnetic field central axis 400, the material 121 is converged toward the magnetic field central axis 400 while swirling around. When the distance of the material 121 with respect to the magnetic field central axis 400 reaches the motion radius R, the material 121 swirls around while maintaining the motion radius R, and is supplied to the target 110.

Furthermore, the magnetic field generating section 302 of the third embodiment may include the coil 315 of the first embodiment, or the first coil 331 and the second coil 332 of the second embodiment. In contrast, the number of windings per length of the coil 315 of the first embodiment may be substantially constant as is the case with the third embodiment.

In the additive manufacturing apparatus 1 of the third embodiment, the laser light 200 is emitted to the target 110 from the outer side of the nozzle 33. Accordingly, the magnetic field generating section 302 can generate a magnetic field in which the motion radius R of the swirling material 121 is sufficiently small from the beginning and the magnetic field central axis 400 is set as the central axis. According to this, the nozzle 33 is miniaturized.

According to at least one of the above-described embodiments, the magnetic field generating section generates the magnetic field on an inner side of the opening of the body. A powder, which swirls around on an inner side of the magnetic field, is ejected from the opening. Accordingly, the powder is supplied to the target in a more accurate manner.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A nozzle comprising:
a body including an opening from which a powder is ejected; and
a magnetic field generating section including a coil, the coil disposed to generate a magnetic field when applied with a current, the magnetic field causing the powder supplied to an inside of the body to swirl around.

2. The nozzle according to claim 1, further comprising:
a supply unit configured to apply a velocity to the powder in a circumferential direction with respect to a central axis of the magnetic field to supply the powder to an inner side of the body.

3. The nozzle according to claim 2,
wherein the coil is configured to generate the magnetic field that increases toward an end of the opening from which the powder is ejected.

4. The nozzle according to claim 3,
wherein the coil includes a plurality of coils overlaid on each other, and the number of the overlaid coils increases toward the end of the opening.

5. The nozzle according to claim 3,
wherein a number of windings of coil per length increases toward the end of the opening.

6. The nozzle according to claim 1,
wherein the body is configured to emit an energy ray from the opening, and
the coil is configured to generate the magnetic field which causes the powder to swirl around the energy ray.

7. An additive manufacturing apparatus comprising:
a nozzle including a body including an opening from which a powder is ejected, and a magnetic field generating section including a coil, the coil disposed to generate a magnetic field when applied with a current, the magnetic field causing the powder supplied to an inside of the body to swirl around; and
an optical device configured to melt or sinter the powder.

8. The additive manufacturing apparatus according to claim 7, further comprising:
a charging unit configured to charge the powder to be supplied to the inner side of the body.

9. The additive manufacturing apparatus according to claim 7,
wherein the body is configured to emit an energy ray from the opening, the energy ray generated by the optical device, and
the coil is configured to generate a magnetic field which causes the powder to swirl around the energy ray.

10. A nozzle comprising:
a body including an opening from which a powder is ejected; and
a magnetic field generating section configured to generate a magnetic field which causes the powder supplied to an inside of the body to swirl around, wherein
the magnetic field generating section is configured to generate the magnetic field that increases toward an end of the opening from which the powder is ejected.

* * * * *